United States Patent [19]

Keim

[11] Patent Number: 4,750,874
[45] Date of Patent: Jun. 14, 1988

[54] AIR COOLING RING FOR PLASTIC FILM

[75] Inventor: Karl H. Keim, S. Berwick, Me.

[73] Assignee: Gloucester Engineering Co., Inc., Gloucester, Mass.

[21] Appl. No.: 1,829

[22] Filed: Jan. 9, 1987

[51] Int. Cl.[4] .............................................. B29C 47/88
[52] U.S. Cl. ................................ 425/72.1; 264/209.3; 264/569; 425/326.1; 425/387.1
[58] Field of Search ............... 425/72 R, 326.1, 387.1, 425/325; 264/566, 569, 564, 209.3

[56] References Cited

U.S. PATENT DOCUMENTS

| 3,176,347 | 4/1965 | Shaul | 425/72 R |
|---|---|---|---|
| 3,888,609 | 6/1975 | Saint Eve et al. | 425/72 R |
| 4,139,338 | 2/1979 | Cole | 425/72 R |
| 4,145,177 | 3/1979 | Schott, Jr. | 425/72 R |
| 4,259,047 | 3/1981 | Cole | 425/72 R |
| 4,272,231 | 1/1981 | Schott, Jr. | 425/72 R |
| 4,330,501 | 5/1982 | Jones et al. | 264/569 X |
| 4,443,400 | 4/1984 | Herrington | 425/72 R X |
| 4,473,527 | 9/1984 | Fujisaki et al. | 425/72 R X |
| 4,478,564 | 10/1984 | Shinmoto | 425/72 R |

FOREIGN PATENT DOCUMENTS 1109216 9/1981 Canada .
304140 7/1971 U.S.S.R. ........................... 425/72 R

OTHER PUBLICATIONS

Plastic World Magazine, Sep. 1986, p. 53.
Plastics Machinery and Equipment, Sep. 1986, p. 30, paragraph 3, sentence 6, also FIG. 8.
Plastics Machinery and Equipment, Sep. 1986, p. 25.

Primary Examiner—Richard L. Chiesa

[57] ABSTRACT

A dual flow air ring is used to cool the exterior surface of thermoplastic tube after the plastic is extruded from an annular die. The surface of the wall forming the divider between the upstream and downstream flow paths which confronts the extruded tube is shaped to include a region of decreasing diameter in the direction of tube travel so that the flow path for air issuing from the lower discharge formed between the extruded tube and the surface is caused to converge. This converging flow stabilizes the tube thereby permitting more vigorous cooling and consequently higher production rates.

6 Claims, 2 Drawing Sheets

AIR COOLING RING FOR PLASTIC FILM

FIELD OF THE INVENTION

The present invention is concerned with cooling apparatus used in the production of plastic film by the process of extruding a tube of plastics and subsequently inflating that form.

REVIEW OF PRIOR ART

It is well known to produce plastic film for various applications by the extrusion of plasticated material through an annular die, thereby forming a tube of heat-softened plastic material. The tube of plastic material is fed through a set of nip rollers, and inflation air is added to the interior of the plastic tube, between the die and the nip rollers, thereby forming an inflated bubble of film between the nip rolls and the die. Addition of air to the interior of the tube causes radial expansion of the tube diameter relative to the die diameter, and consequently thinning and orientation of the plastic film, while rotation of the nip rollers at a surface speed greater than the surface speed of the material exiting from the die causes additional thinning and orientation of plastic material in the machine direction. In such "blown film" operations, it is customary to pass the freshly extruded tube through the interior of an exterior air cooling ring, usually termed an air ring, in which one or more streams of cooling air are directed onto the exterior surface of the film. To promote rapid cooling, it is desirable to direct large quantities of high velocity air towards the bubble.

In typical prior art dual flow air rings, such as that shown in U.S. Pat. Nos. 4,259,047 and 4,139,338, the total air flow applied to the plastic film is divided into an upper air stream and lower air stream. The divider between the upper and lower air streams, typically called a lip, usually has the form of a conical surface on its inner surface, wherein the diameter of the conical surface increases in the downstream direction of plastic travel. In operation, the freshly extruded softened plastic and this conical lip surface form the boundaries through which the lower cooling air stream flows. As the air flows through this gap, its pressure drops relative to that inside the bubble, helping the bubble to expand radially. As long as the velocity of the lower air stream is low, the bubble remains stable; however, as air stream velocity increases the resulting lowered air pressure between the lip and the bubble wall displaces the soft and relatively weak bubble wall until it contacts, at some point, the lip surface choking off the lower air stream. As the lower air stream is choked off, the now static air pressure increases and forces the bubble away from the lip. This cycle of attraction and repulsion repeats at a frequency dependent on the velocity of the lower air stream, and the thickness and strength of the bubble wall; this instability of the bubble results in poor cooling and variable gauge performance. This instability effectively limits the air flow through the lower gap, and consequently the extent of cooling obtained from the lower air flow. The bubble of the cooling air flow is provided through the downstream air passage, where the now partially cooled bubble is better able to withstand the lowered pressure between the bubble surface and the wall of the air ring.

In many blown film operations, the ability to cool the bubble of extruded plastic is the rate limiting step. Typical maximum rates for well adjusted dual flow air rings built in accordance with the prior art, when operating on low density polyethylene resins, heavier low density polyethylene resins, or blends thereof are approximately 13 lbs. per inch of die circumference per hour.

DEFINITION OF THE INVENTION

It is therefore an object of the present invention to provide a new high capacity air ring for use in the production of plastic film by the blown film process, which enables the bubble to remain stable with significantly higher volume high velocity flows from the lower cooling ring. In accordance with the present invention there is provided an air ring means adapted to be mounted in operative relation to a tubular extrusion die, capable of supplying two streams of cooling air to the surface of the bubble after extrusion comprising:

a ring shaped plenum having air inlet means and two air transfer means, first annular air outlet means and second annular air outlet means positioned axially downstream in the direction of tube flow from first annular outlet means, wherein the inside diameter surface of the wall between the first air outlet and second air outlet means has a ramp which protrudes radially inwards towards the bubble wall, whereby a converging flow path for air discharging from the first annular air outlet means is defined between said ramp and the bubble surface.

DESCRIPTION OF THE PREFERRED EMBODIMENTS

The apparatus of this invention is used for producing thermoplastic films by the so-called blown film process. Resins capable of producing films by this process include, but are not limited to olefin type resins such as the polyethylenes, including the high pressure low density types, linear low density types, and the high density types; polypropylenes, ethylene propylene copolymers and polybutanes. In terms of commercial usage, however, the polyethylene type resins are most generally used.

Figure 1:
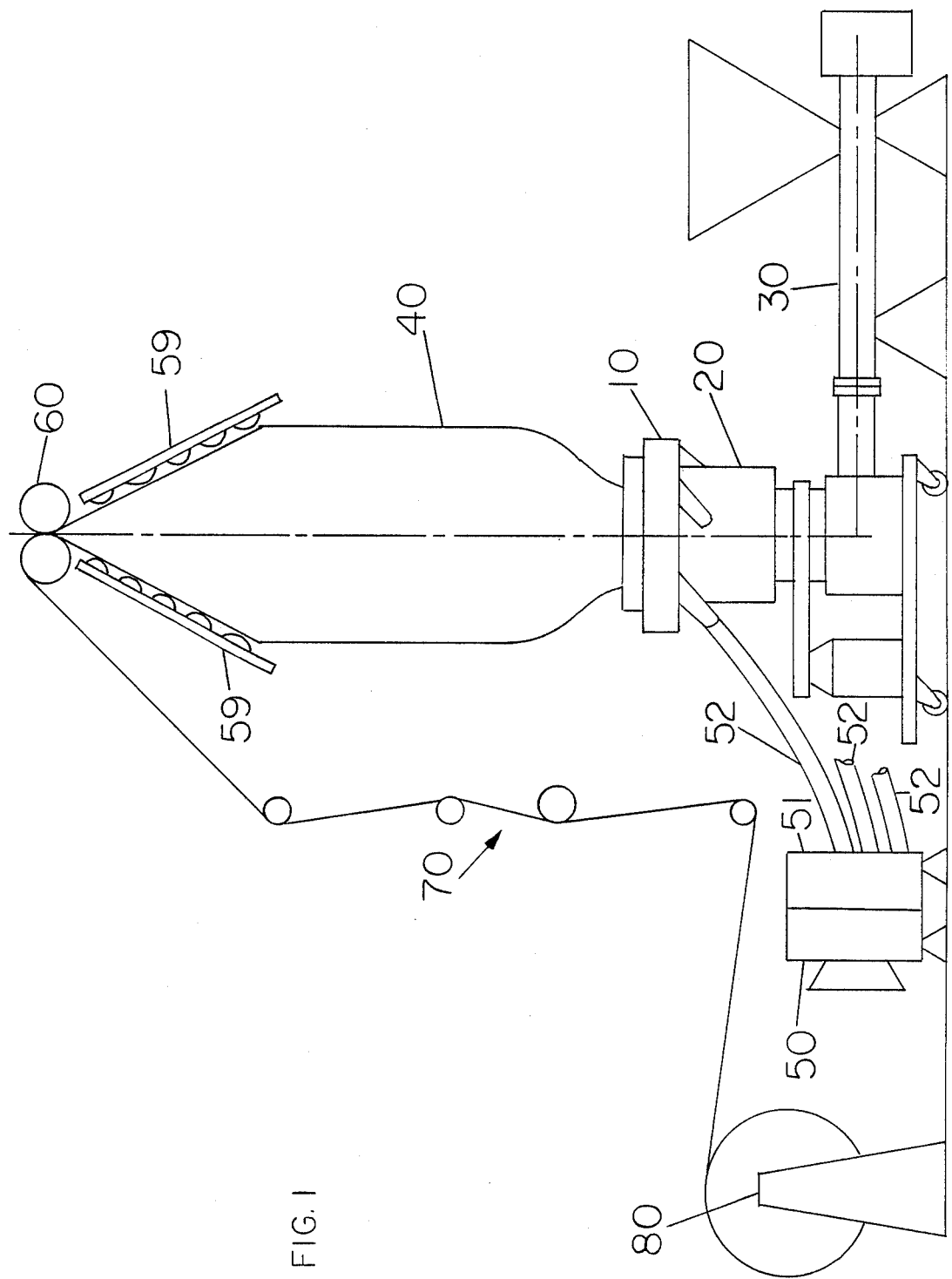
FIG. 1 is an elevation view showing the general configuration of a blown film line.

Proceeding now to FIG. 1, wherein an overall typical configuration of a blown film apparatus, including apparatus of the type of the present invention, is shown. As shown in this FIG. 1, an extruder 30 is operably connected with an annular die assembly 20 to provide for the forwarding and plasticating of resin, and their extrusion through the die assembly 20. Although die assembly 20 as shown in FIG. 1 is a rotating die assembly, the air ring of the present invention works equally well with non-rotating die assemblies; the selection of a rotating or non-rotating die assembly is typically dependant on whether the film produced will be wound into rolls or converted inline into a finished product. As shown in FIG. 1, the air ring assembly of the present invention 10 is located adjacent to the discharge side of the annular rotating die assembly 20. The tubular extruded plastic is inflated from the interior, and flattened and collapsed by a set of collapsers 59 and nip rolls 60. The flattened and collapsed film is then led to a winding device of conventional construction 80 by a film guiding and transfer means 70. Connected to the air ring means of the present invention 10 is a blower assembly 50 attached by one or more conduit means, 52 to the air ring assembly. Blower assembly 50 should be one in which the output can be controlled at a preset level. Such blowers maybe powered by a variable speed drive, or they may include various valve arrangements to regulate their output. Also shown as 51 is an air chiller, used to refrigerate the air directed against bubble 40. The use of chilled air is not required for the practice of this present invention, although the use of chilled air is advantageous to the production rate of film produced by the blown film process.

Figure 2:
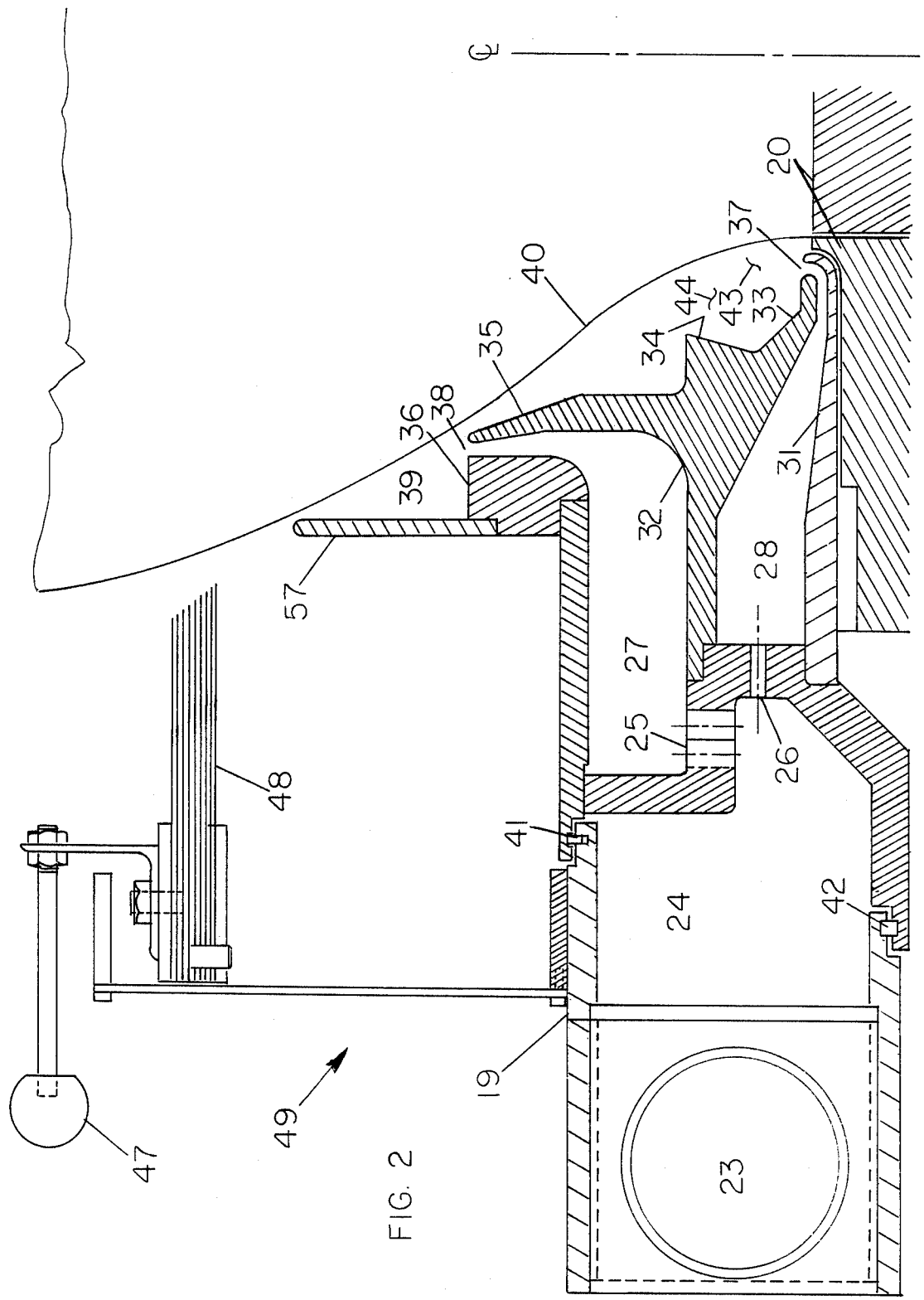
FIG. 2 is a partial cross sectional view taken through the centerline of an air ring according to the present invention.

The air ring means of the present invention is shown in greater detail in FIG. 2. In FIG. 2 the air ring means in the present invention is shown mounted on annular die head, 20. Die 20 is of conventional construction, and may be a single or multi-layer die, rotating or non-rotating assembly. The die itself forms no part of the present invention. Air from the blower supply means 50 (not shown in FIG. 2) passes through conduit means 52 (also not shown in FIG. 2) through air inlet means 23 into the ring shape plenum 24 in the air ring body 19. Although a tangential side entry air inlet means is shown in FIG. 2, simple radial entry or bottom air entry means as shown in FIG. 1 may also be used; such entry means, however, are known to those skilled in the design of air cooling rings. Air from plenum 24 flows into lower air ring annulus plenum 28 through lower plenum feed means 26, or into upper annulus plenum 27 through upper plenum feed means 25.

As shown in FIG. 2, the relative proportions of air going to upper air ring plenum 27 and lower air ring plenum 28 is primarily dependent upon the area of the upper air ring plenum feed means 25 and lower air ring plenum feed means 26. The geometry of feed means 25 and 26 is not important to the present invention, and may take the form of essentially any aperture in the dividing wall. For ease of manufacture, the inlet means shown in FIG. 2 are simply cylindrical channels drilled through the dividing wall. Air within plenum 28 will flow largely radially inwardly, escaping through lower annular air outlet means 37 formed between lower lip 31 and intermediate lip 32. It has been found advantageous to have the air escaping from this air outlet means contact the surface of the plastic bubble 40 at a low angle of incidence as shortly after extrusion as possible. For this reason lower lip 31 is countersunk into the sizing ring of die 20. Downstream from the discharge corner of intermediate lip 32 the inside diameter of the intermediate lip first increases radially in the downstream direction of travel in the area generally designated as 33 and then sharply decreases in inside diameter to produce an abrupt wedge shaped ramp 34 as shown in FIG. 2. This ramp 34 and the tube 40 define a converging flow path for the air issuing from annulus 37. Continuing downstream in the direction of tube flow from ramp 34, the inside diameter surface of the intermediate lip 32 increases rapidly and has a wall of essentially uniform diameter and then a conically outward tapering section as shown at 35. The angle of tapered portion 35 and the maximum decrease in inside diameter due to ramp 34 are selected to generally provide a slightly converging gap between the surface 35 of the downstream portions of intermediate lip 32 and tube 40.

The air which enters upper plenum 27, flows essentially radially inwardly and discharge through the annular discharge means 38 formed between the outside diameter of intermediate lip 35 and the inside diameter of outer lip 36. A stack 37 is used to define a slightly converging flow path between stack 37 and tube 40 for the air released from annular discharge means 38. Mounted to the stationary upper surface of the air ring is a conventional adjustable iris assembly, identified generally in FIG. 2 as 49. The inside diameter of this assembly can be varied by movement of adjusting handles 47 which are connected so as to cause the radial position of iris leaves 48 to vary. Radial position of iris leaves 48 is used to modify cooling air flow high up on tube 40.

The air ring shown in FIG. 2, as will be apparent to those skilled in the art, is designed to permit rotation of the inside portion of the air ring including inner lip 31, intermediate lip 32 and outer lip 36 with die 20, while maintaining the air inlet means 23 essentially stationary. To permit rotation of the inner portions of the air ring and to provide sealing between air ring plenum 24 and the outside, the air ring of the present invention is equipped with two polytetrafluorethylene combination bearings and seals 41 and 42. These two sealing strips, which fill circular grooves around the air ring, serve both as rotary bearings to permit relative rotation of the inside and outside portion of the air ring, and also as seals to prevent the pressurized air in plenum 24 from escaping to the outside.

In those instances in which rotation of die 20 is not required based on the end product to be produced, for instance if stacked bags are to be produced inline, then the combination bearing and sealing strips 41 and 42 and their associated grooves could be deleted and a simple mechanically fixed construction employed.

In operation the new air ring operates as follows: Tube 40 is extruded from die 20 which is mounted in a close fixed relationship to ring member 31. In fact, as previously indicated, inner lip 31 is countersunk into the die to allow the lower cooling air flow to contact tube 40 as soon as possible after extrusion. Blower assembly 50 has previously been adjusted for maximum output at which tube 40 remains stable. After leaving annulus 37, the cooling air will accelerate in the region nominally shown as 43, and its static pressure will drop. This reduction in static pressure relative to tube 40 will cause the relatively hot and soft wall of tube 40 to expand radially outward. In the region shown generally in FIG.2 as 44, the flow path defined by tube 40 and surface 34 of intermediate lip 32 converges rapidly, which results in an effective increase in the static pressure of the flowing cooling gas stream relative to the bubble. This zone of relatively increasing pressure counteracts the tendency of tube wall 40 to expand radially too rapidly with an accompanying loss of stability.

After transversing surface 34, the lower cooling stream is once again allowed to accelerate, with the resulting lower pressure again urging a radial expansion of tube 40. The flow path between tube 40 and surface 35 is a slightly converging flow path, to control the radial expansion of the tube. The use of the radial ramp to produce a rapidly converging flow path promotes a more uniform bubble shape and stabilizes the tube wall and therefore permits a high flow rate from the lower annulus and consequently improved cooling.

Beyond the downstream tip of intermediate lip 32, the emerging air flow from the downstream annulus 38 is brought against tube 40. Because of the bubble geometry retaining features of intermediate ring 32, the main cooling flow is brought into contact with tube 40 at a grazing angle of incidence, where this flow readily attaches to tube 40 for maximum cooling efficiency and minimum disruption of tube stability.

The combined air flow from both the upstream and downstream annuli are now briefly allowed to accelerate in the region denoted as 39, and then to converge between tube 40 and chimney 37. An adjustable iris assembly 49 is also provided to further shape the bubble in the region above the chimney, if desired. It has been found generally useful to adjust iris leaves 48 to a position near tube 40 such that the gap between the inside diameter of iris and tube 40 is approximately twice the minimum gap between the inside of chimney 37 and tube 40.

EXAMPLES

The following examples of blown film extrusion using the air ring described in this application were observed. In all cases, the same 10 inch single layer die were used along with an 80 mm 24/1 L/D helical grooved extruder equipped with a barrier screw. The adjustable iris was brought to within approximately 1 inch from the tube wall. The blower was adjusted for maximum flow output as limited by tube stability. Tube inflation was adjusted for a layflat width of the collapsed tubing of 42" equivalent to an approximate blow up ratio of 2.7. Film thickness was controlled by adjustment of the nip roll speed.

EXAMPLE A

A resin blend consisting of 15% by weight of a high pressure low density resin (Dow 685) and 85% of an actene based linear low density resin (Dow 2045A) was extruded at a speed of 120 screw rpm and a melt temperature of 390° F. Plenum air temperature was 72° F., and plenum pressure was 8.1" of water. Film of good commercial quality having a thickness of 1.8 mil was produced at a rate of 22.6 lbs per inch of die circumference per hour.

EXAMPLE B

A 100% hexene based linear low density resin (Mobil MSA-042) was extruded at 95 screw rpm and a melt temperature of 386° F. Plenum air temperature was 58° F. and plenum air pressure was 6" of water. Good commercial quality film having a thickness of 1.4 mil was produced at a rate of 19.4 lbs per hour per inch of die circumference.

EXAMPLE C

A hexene based linear low density resin (Mobil MSA-042) was extruded at 105 screw rpm and a melt temperature of 382° F. Plenum temperature was 44° F. and plenum pressure was 6" of water. Good commercial quality film having a thickness of 1.4 mil was produced at a rate of 20.7 lbs. per inch of die circumference per hour.

EXAMPLE D

The same resin as used in Example B was extruded at 110 screw rpm and a melt temperature of 384° F. Plenum air temperature was 45° F. and plenum pressure 6" of water. Good commercial quality film of 1.0 mil thickness was produced at a rate of 21.5 lbs per hour per inch of die circumference.

EXAMPLE E

A 100% octene based linear low density resin (Dow 2045A) was extruded at 117 screw rpm and a melt temperature of 360° F. Plenum air temperature was 51° F. and plenum air pressure was 9.2" water. Good quality light sheet having a thickness of 0.017" was produced at a rate of 23.4 lbs per inch of die circumference per hour.

I claim:

1. Air ring means for supplying two successive streams of cooling air to the exterior surface of a plastic tube after extrusion from an annular die; said air ring comprising; a ring shaped plenum having air inlet means and a first air transfer means and a second air transfer means; first annular air outlet means; second annular air outlet means positioned axially downstream in the direction of travel of said tube from said first annular air outlet means, said first annular air outlet means connected to said plenum by said first air transfer means; said second annular air outlet means connected to said plenum by said second air transfer means; said first annular air outlet means formed between an outside diameter surface of a lower lip means and inside diameter surface of an intermediate lip means, said lower lip means adapted to be mounted in operative relation to a tubular extrusion die; said intermediate lip means of greater axial height then said lower lip means; the surface of said intermediate lip means confronting said tube having a region of decreasing inside diameter in the direction of tube travel downstream of a region of increasing diameter in the direction of the tube travel; whereby a converging flow path for air issuing from said first annular air outlet means is defined between said region of decreasing inside diameter and said tube.

2. Apparatus according to claim 1 wherein the surface of said intermediate lip means which confronts said tube is of increasing diameter in the direction of tube travel at a location downstream of said region of decreasing inside diameter.

3. Apparatus according to claim 2 wherein the surface of said intermediate lip means which confronts said tube is of essentially constant diameter in the direction of tube travel at a location between said region of decreasing diameter and said region of increasing diameter located downstream of said region of decreasing diameter.

4. Apparatus according to claim 3 further characterized in that the minimum diameter of said region of decreasing diameter is selected so that a converging air flow path is also defined between said tube and said region of increasing diameter downstream of said region of decreasing diameter.

5. Apparatus according to claim 3 further comprising an adjustable iris assembly mounted downstream in the direction to travel from said second annular air outlet means.

6. In an air ring for cooling the exterior surface of an extruded tube of plastic of the type having a first and second annular air discharge zones surrounding the exterior of the extruded tube, wherein said second annular air discharge zone is located axially downstream in the direction of tube movement from said first annular air discharge zone, said first annular air discharge zone formed between an inner lip member and an intermediate lip member of greater diameter than said inner lip member, said intermediate lip member having a substantially greater axial height in the direction of tube movement than said inner lip member, said intermediate lip member formed so that the surface confronting the extruded tube is a largely conical surface with the large end of the cone oriented in the downstream direction of tube travel, the improvement comprising shaping the surface of said intermediate lip to include a radially inwardly protruding wedge shaped ramp, said ramp oriented so that the inside diameter of said intermediate lip in the region of said ramp decreases in the direction of tube travel and wherein said wedge shaped ramp is located on said intermediate lip downstream in the direction of tube travel from a first region of said intermediate lip having a conical surface oriented so that the large end of the cone is located downstream in the direction of tube travel, and upstream from a second region of said intermediate lip having a conical surface oriented so that the large end of the cone is located downstream in the direction of tube travel, whereby a converging flow path for air discharged from said first annular air discharge zone is formed between said ramp and said tube.

* * * * *